US007213557B2

(12) United States Patent
Kondo et al.

(10) Patent No.: US 7,213,557 B2
(45) Date of Patent: May 8, 2007

(54) AIR INTAKE CONTROL SYSTEM

(75) Inventors: Tetsuji Kondo, Tokyo (JP); Mikihiko Suzuki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/349,168

(22) Filed: Feb. 8, 2006

(65) Prior Publication Data

US 2007/0017473 A1 Jan. 25, 2007

(30) Foreign Application Priority Data

Jul. 25, 2005 (JP) ............................ 2005-214399

(51) Int. Cl.
*F02M 35/10* (2006.01)
*F16K 31/02* (2006.01)

(52) U.S. Cl. ............................ 123/184.53; 251/129.11

(58) Field of Classification Search ........... 123/184.53, 123/399; 251/129.11

See application file for complete search history.

(56) References Cited

U.S. PATENT DOCUMENTS 5,983,858 A * 11/1999 Hashimoto et al. ......... 123/399
6,860,466 B2 * 3/2005 Sakurai et al. ......... 251/129.11

FOREIGN PATENT DOCUMENTS

JP 11-173166 A 6/1999
JP 2004-124933 A 4/2004

* cited by examiner

*Primary Examiner*—Noah P. Kamen
(74) *Attorney, Agent, or Firm*—Sughrue Mion, PLLC

(57) ABSTRACT

An air intake control system includes valve elements disposed in intake passages for varying the cross-sectional area of each intake passage, a valve shaft for transmitting a driving force to the valve element, an actuator including a motor for producing the driving force for turning valve shaft, a worm gear mounted on a rotary shaft of the motor, and a housing accommodating the motor and the worm gear, and a driving gear which meshes with the worm gear to transmit the driving force supplied from the actuator to the valve shaft. The driving gear includes a boss portion, a tooth portion which meshes with the worm gear, and an elastic member which is sandwiched between and bonded to the boss portion and the tooth portion. The boss portion rotates together with the valve shaft, whereas the tooth portion and the elastic member can rotate relative to the valve shaft.

7 Claims, 5 Drawing Sheets

AIR INTAKE CONTROL SYSTEM

BACKGROUND OF THE INVENTION

1. Field of the Invention

The present invention relates to an air intake control system provided in an air intake line of an internal combustion engine.

2. Description of the Background Art

Generally, an air intake control system of an internal combustion engine employs an air intake control apparatus which includes an intake air control valve disposed in an inlet pipe connected to cylinders, the intake air control valve including a valve shaft and a valve element mounted pivotably about the valve shaft. The valve shaft is turned in a controlled fashion by an actuator, such as a motor, whereby the valve element is pivoted between a fully opened position and a completely closed position to adjust intake passage cross section of the inlet pipe.

For example, Japanese Patent Application Publication No. 2004-124933 discloses a variable air intake control apparatus including a valve element mounted on a valve shaft disposed in an intake passage within an intake manifold which is connected to engine cylinders. The valve element is mounted pivotably about the valve shaft which is supported by the intake manifold. A gear is fixedly mounted on the valve shaft and the valve element is controllably opened and closed by a driving force produced by a motor of which rotary shaft is fitted with a pinion that meshes with the gear of the valve shaft.

In the variable air intake control apparatus thus structured, the valve element goes into contact with a stopper at a fully opened position and at a completely closed position. One problem of this variable air intake control apparatus is that an impact load acts on the valve element due to inertia of the motor and of the gear fitted on the valve shaft when the valve element goes into contact with the stopper, causing an impact on meshing teeth of the gear fitted on the valve shaft and the pinion fitted on the motor shaft. Since contact areas of the meshing teeth carry the entirety of the impact load, the teeth of the gear and the pinion are likely to break.

One approach to reducing this impact load for overcoming the aforementioned problem is introduced in Japanese Patent Application Publication No. 1999-173116, which discloses an air intake control apparatus in which a gear (motor gear) fitted on a rotary shaft of a motor and a gear (throttle gear) fitted on a valve shaft carrying a valve element are helical gears, and the motor gear fitted on the rotary shaft is sandwiched by a pair of spring washers. The motor gear is mounted on the rotary shaft in such a manner that the motor gear can move along an axial direction of the rotary shaft but does not rotate relative to the rotary shaft. When the throttle gear goes into contact with a stopper and stops at a fully opened position or at a completely closed position, one of the spring washers is compressed and the other extends, whereby the motor gear moves along the axial direction of the rotary shaft and an impact load caused by inertia is alleviated.

The air intake control apparatus of Japanese Patent Application Publication No. 1999-173116 however poses the following problems:

(1) The helical gears are complicated in structure and are difficult to manufacture;

(2) The structure of the Publication, in which one of the helical gears sandwiched by the spring washers is mounted movably along the rotary shaft but unturnably around the rotary shaft, requires a larger number of components including the spring washers and stoppers therefor as well as a complex assembly process; and (3) Foreign matter may intrude between sliding areas of the helical gear and the rotary shaft when the helical gear moves along the rotary shaft, or the spring washers may be damaged by repeated stress over the course of time, resulting in poor reliability of the air intake control apparatus.

SUMMARY OF THE INVENTION

The present invention is intended to overcome the aforementioned problems of the prior art. Accordingly, it is an object of the invention to provide a highly reliable air intake control system which can alleviate an impact load exerted on gears mounted on a motor shaft and a valve shaft with a minimum number of components without using helical gears which are difficult to manufacture.

An air intake control system of the invention includes an intake passage for supplying intake air to an internal combustion engine, a valve element disposed in the intake passage for varying the cross-sectional area of the intake passage by pivoting between fully opened and completely closed positions, a valve shaft for transmitting a driving force for pivoting the valve element to the valve element, an actuator including a prime mover (motor) for supplying the driving force for pivoting the valve element, a driving force transmission gear (worm gear) which is fitted to the motor and rotated thereby, and a housing accommodating the motor and the worm gear, and a driving gear which is mounted on the valve shaft and meshes with the worm gear to transmit the driving force supplied from the actuator to the valve shaft.

The driving gear includes a boss portion, a tooth portion which meshes with the worm gear to receive the driving force supplied from the actuator, and an elastic member which is sandwiched between and bonded to the boss portion and the tooth portion and elastically deforms when twisted.

The boss portion has a hole into which the valve shaft is inserted in such a manner that the boss portion rotates together with the valve shaft. The tooth portion and the elastic member have holes into which the valve shaft is inserted in such a manner that the tooth portion and the elastic member can rotate relative to the valve shaft. An impact load caused by opening and closing motion of the valve element is alleviated by torsional deformation of the elastic member in a turning direction of the valve shaft.

In the air intake control system thus structured, the impact load acting on the tooth portion of the driving gear and the worm gear is absorbed by torsional deformation of the elastic member so that damage to the tooth portion of the driving gear and the worm gear is avoided. It will be appreciated that the invention provides a highly reliable air intake control system built with a minimum number of components without using helical gears.

These and other objects, features and advantages of the invention will become more apparent upon reading the following detailed description along with the accompanying drawings.

DESCRIPTION OF THE PREFERRED EMBODIMENTS

An air intake control apparatus and an intake vortex generator are examples of air intake control systems provided in an air intake line of an internal combustion engine. The invention is hereinafter described with reference to specific embodiments thereof in which the invention is implemented in an air intake control apparatus.

FIRST EMBODIMENT

Figure 1:
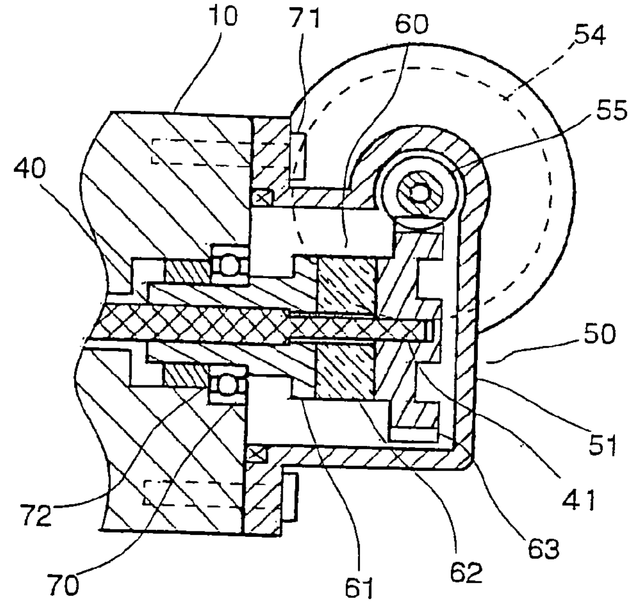
FIG. 1 is a cross-sectional view showing an actuator, a driving gear and components in surrounding areas thereof of an air intake control apparatus according to a first embodiment of the invention.
Figure 2:
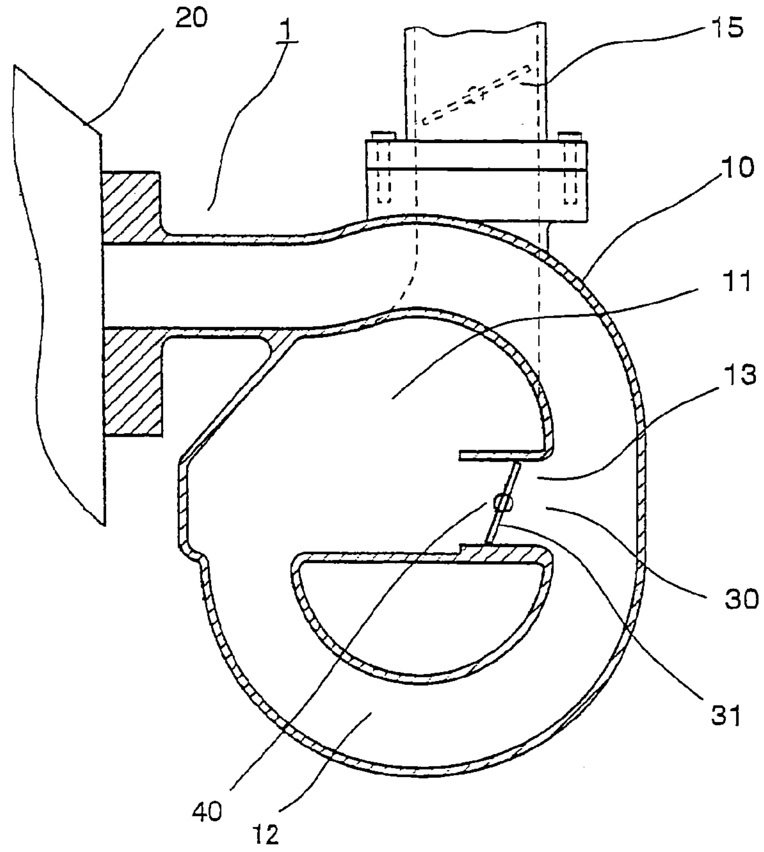
FIG. 2 is a cross-sectional view formed by a plane cutting through an intake passage along a centerline thereof showing the air intake control apparatus installed on an internal combustion engine.
Figure 3:
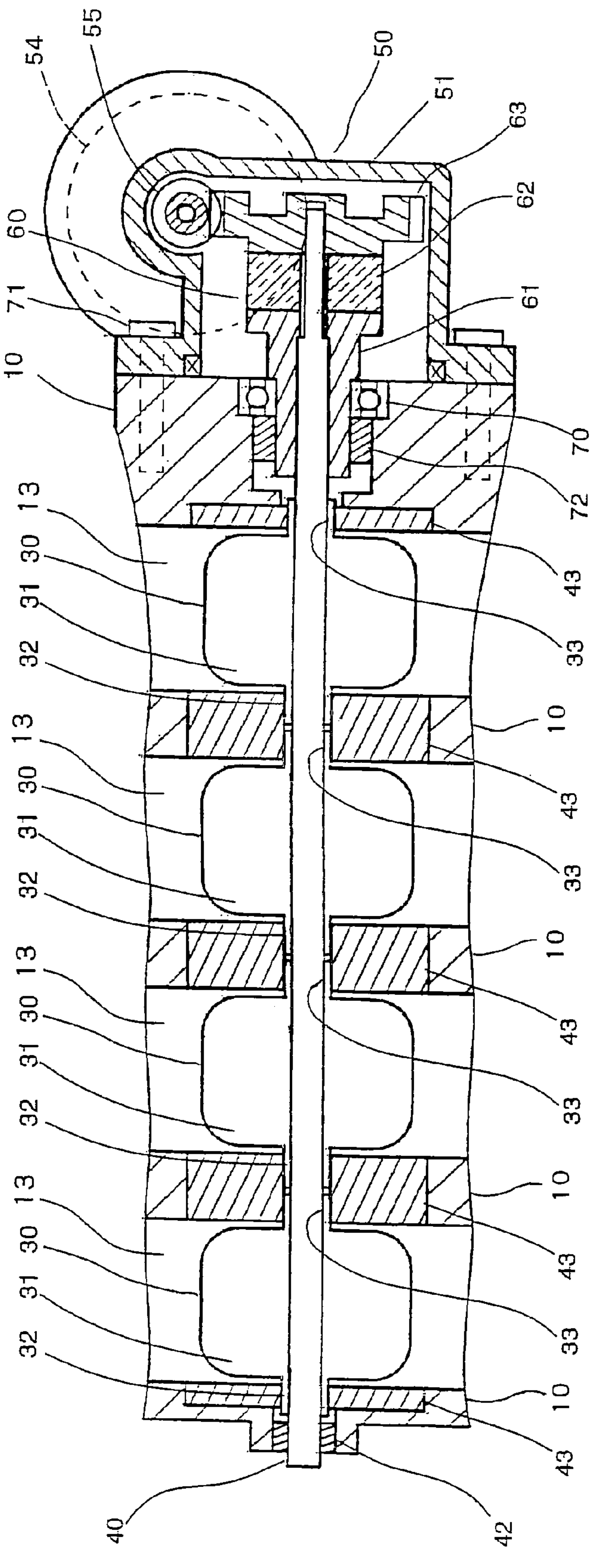
FIG. 3 is a cross-sectional view showing how valve elements are connected to the actuator of the air intake control apparatus of the first embodiment.
Figure 4:
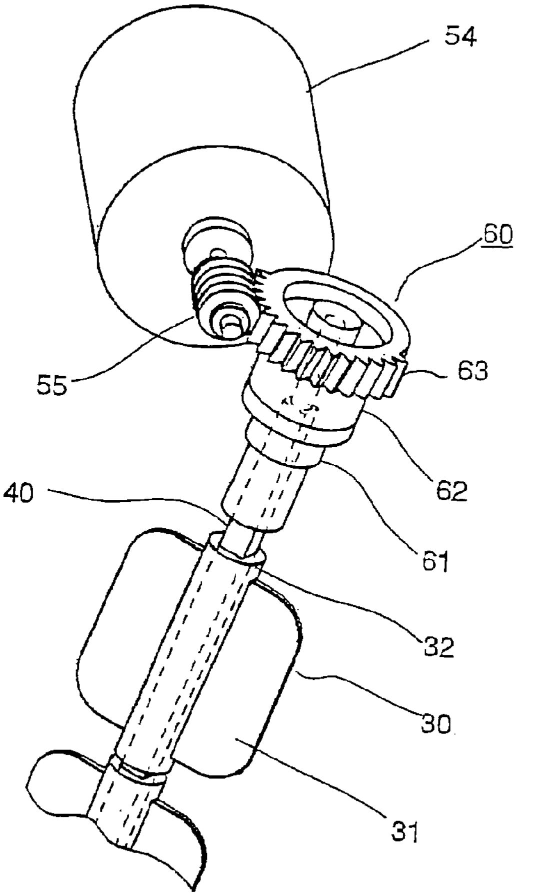
FIG. 4 is a perspective view showing a gear mechanism of the air intake control apparatus of the first embodiment.

FIG. 1 is a cross-sectional view showing an actuator 50, a driving gear 60 and components in surrounding areas thereof of an air intake control apparatus 1 according to a first embodiment of the invention, FIG. 2 is a cross-sectional view formed by a plane cutting through an intake passage along a centerline thereof showing the air intake control apparatus 1 installed on an internal combustion engine, FIG. 3 is a cross-sectional view showing how valve elements 30 are linked to the actuator 50 of the air intake control apparatus 1 of the first embodiment, and FIG. 4 is a perspective view showing a gear mechanism of the air intake control apparatus 1 of the first embodiment.

As shown in FIG. 1, the actuator 50 includes a motor 54 serving as a prime mover for producing a driving force for turning a valve shaft 40, a worm gear (driving force transmission gear) 55 which is fixedly mounted on a rotary shaft of the motor 54 and meshes with teeth cut around a tooth portion 63 of the driving gear 60 to transmit the driving force of the motor 54 to the tooth portion 63 of the driving gear 60, and a housing 51 fixing and enclosing the motor 54. The housing 51 is fixed to an intake manifold (inlet pipe) 10 by a plurality of screws 71. The driving gear 60 includes the aforementioned tooth portion 63, a boss portion 61 and an elastic member 62 disposed between the tooth portion 63 and the boss portion 61. The boss portion 61 and the elastic member 62, and the elastic member 62 and the tooth portion 63, are bonded at contact surfaces thereof with an adhesive agent, whereby the boss portion 61, the elastic member 62 and the tooth portion 63 are joined into a single structure.

The valve shaft 40 has a noncircular cross section as viewed along a central axis thereof (refer to FIG. 4). One end portion of the valve shaft 40 forms a cylindrical projecting part 41 extending from a noncircular portion of the valve shaft 40. In the boss portion 61 of the driving gear 60, there is formed a hole having the same noncircular cross-sectional shape as the valve shaft 40 as viewed along a central axis of the boss portion 61. In the elastic member 62 and the tooth portion 63 there are formed holes of which diameter is slightly larger than the diameter of the projecting part 41 of the valve shaft 40 as viewed along a central axis of the elastic member 62 and the tooth portion 63.

The valve shaft 40 is inserted into the central holes of the boss portion 61, the elastic member 62 and the tooth portion 63 in this order. The valve shaft 40 is forcibly fitted into the central hole of the boss portion 61 so that the boss portion 61 does not rotate relative to the valve shaft 40. The elastic member 62 and the tooth portion 63 are fitted on the cylindrical projecting part 41 at one end portion of the valve shaft 40 having a slightly smaller diameter than the diameter of the central holes of the elastic member 62 and the tooth portion 63 so that the elastic member 62 and the tooth portion 63 can rotate relative to the valve shaft 40. The boss portion 61 of the driving gear 60 is rotatably supported by a bearing 70, and a seal member 72 is fitted between the housing 51 and the intake manifold 10 to seal off a gap therebetween. The tooth portion 63 of the driving gear 60 is precisely positioned in the aforementioned structure so that the teeth of the tooth portion 63 correctly mesh with teeth of the worm gear 55.

The tooth portion 63 and the boss portion 61 are formed by molding polyamide resin and the elastic member 62 is formed by molding vulcanized synthetic nitrile rubber, for example. The elastic member 62 may be formed by a vulcanizing process between the tooth portion 63 and the boss portion 61 which are formed in advance such that the boss portion 61, the elastic member 62 and the tooth portion 63 are joined into a single structure without using any adhesive agent.

As shown in FIG. 2, the intake manifold 10 of the air intake control apparatus 1 interconnects a surge tank 11 and an engine body 20. Intake air drawn in through an intake duct (not shown) is introduced into the surge tank 11 through an air cleaner (not shown) and a throttle body in which a throttle valve 15 (FIG. 2) is disposed and distributed to individual tubes (or intake runners) which are formed in the intake manifold 10, as if branching out from the surge tank 11. The intake runners formed in the intake manifold 10 lead to individual cylinders formed in the engine body 20, each of the intake runners including an low-speed intake passage 12 used in low-speed ranges and an high-speed intake passage 13 used in high-speed ranges. The overall length of the low-speed intake passage 12 as measured up to the engine body 20 is made larger than that of the high-speed intake passage 13. The low-speed intake passage 12 and the high-speed intake passage 13 branch out from the surge tank 11 and join downstream at an engine body side.

The aforementioned valve elements 30 which are mounted on the valve shaft 40 are disposed in a plurality of high-speed intake passages 13 of the individual intake runners as illustrated in FIG. 3 so that the high-speed intake passages 13 can be opened and closed by pivot action of the valve elements 30 to permit and interrupt intake air flow through the intake passages 13. The actuator 50 turns the valve shaft 40 to open and close the valve elements 30 according to engine speed. Specifically, the valve elements 30 are closed to form intake passageways having an increased overall length when the engine speed is low, whereas the valve elements 30 are opened to form intake passageways having a reduced overall length when the engine speed is high. It is possible to improve engine torque performance regardless of engine speed by closing the valve elements 30 to increase the overall length of the intake passageways in low engine speed ranges and by opening the valve elements 30 to decrease the overall length of the intake passageways at high engine speed ranges.

Referring to FIG. 3, the intake manifold 10 includes the plurality of high-speed intake passages 13 branching out to the individual cylinders, and the individual valve elements 30 are disposed in the high-speed intake passages 13. Each of the valve elements 30 includes a flat valve plate 31 and sleeves 32 extending from both sides of the valve plate 31. A noncircular valve shaft hole 33 is formed in each valve element 30, passing through the valve plate 31 and the sleeves 32 thereof. The valve shaft hole 33 has the same noncircular cross-sectional shape as the valve shaft 40 as viewed along the central axis of the valve shaft 40, so that the valve elements 30 do not rotate relative to the valve shaft 40 when the valve shaft 40 is inserted into the valve shaft holes 33 formed in the valve elements 30.

The valve plate 31 and the sleeves 32 of each valve element 30 are made of polyamide resin, for instance, together forming a single structure, while the valve shaft 40 is made of metallic material, such as steel.

As previously mentioned, the boss portion 61 of the driving gear 60 fixed at one end portion of the valve shaft 40 is rotatably supported by the bearing 70. A middle portion and the opposite end portion of the valve shaft 40 are rotatably supported by the intake manifold 10 via shaft guide bearings 43 fitted therein. The end portion of the valve shaft 40 opposite to the aforementioned projecting part 41 forms a cylindrical part which is slidably held by a bushing 42 fitted in an end of the intake manifold 10, the bushing 42 having a sealing function.

Referring to FIG. 4, the worm gear 55 fixedly mounted on the rotary shaft of the motor 54 meshes with the tooth portion 63 of the driving gear 60. Actuated by an unillustrated control device, the motor 54 turns the worm gear 55 in a controlled fashion and this rotary motion of the worm gear 55 is transmitted to the valve shaft 40 through the tooth portion 63 of the driving gear 60, causing the valve elements 30 to open and close the respective high-speed intake passages 13. The valve elements 30 go into contact with stoppers (not shown) at a fully opened position and at a completely closed position. Although an impact load acts on the valve elements 30 when the valve elements 30 go into contact with the stoppers due to inertia of the motor 54 and of the valve elements 30 themselves, the impact load is absorbed by torsional deformation of the elastic member 62 so that a resultant impact load on the tooth portion 63 of the driving gear 60 is reduced. Therefore, the above-described air intake control apparatus 1 of the first embodiment does not require difficult-to-manufacture helical gears or a large number of components unlike the earlier-mentioned structure of Japanese Patent Application Publication No. 1999-173116.

According to the aforementioned structure of the first embodiment, the tooth portion 63 and the boss portion 61 of the driving gear 60 are joined by the elastic member 62 so that the impact load acting on the valve elements 30 due to the inertia of the motor 54 and of the valve elements 30 is absorbed and the resultant impact load on the teeth of the tooth portion 63 is alleviated without the need for helical gears or a large number of components. It is appreciated from the foregoing that the structure of the first embodiment serves to prevent damage to the tooth portion 63 and the worm gear 55 and provide a highly reliable air intake control system.

SECOND EMBODIMENT

Figure 5:
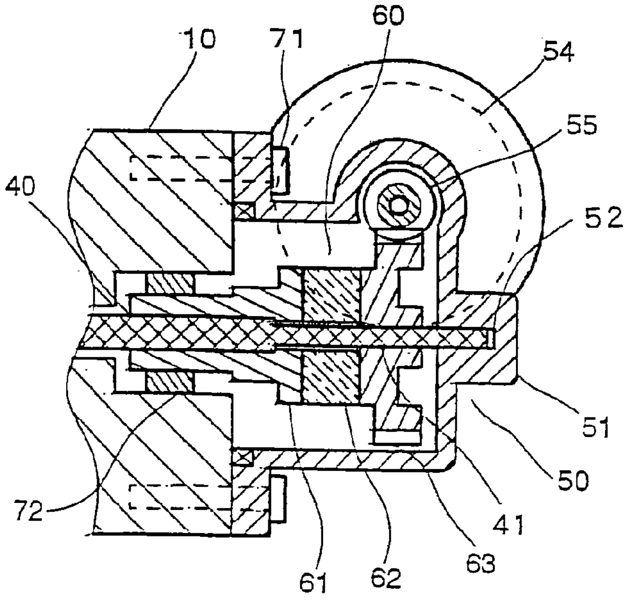
FIG. 5 is a cross-sectional view showing an actuator, a driving gear and components in surrounding areas thereof of an air intake control apparatus according to a second embodiment of the invention.

FIG. 5 is a cross-sectional view showing an actuator 50, a driving gear 60 and components in surrounding areas thereof of an air intake control apparatus 1 according to a second embodiment of the invention, in which elements identical or similar to those of the first embodiment (FIG. 1) are designated by the same reference numerals.

Referring to FIG. 5, there is not provided the bearing 70 (refer to FIG. 1) for rotatably supporting the boss portion 61 of the driving gear 60 in the air intake control apparatus 1 of the second embodiment. Instead, there is formed a bearing hole 52 in the housing 51 for rotatably supporting the projecting part 41 of the valve shaft 40. The bearing hole 52 has a slightly larger diameter than the projecting part 41 of the valve shaft 40 so that the valve shaft 40 can rotate.

According to the second embodiment, there is no need for the bearing 70 for supporting the valve shaft 40.

In the structure of the first embodiment, the bearing 70 for rotatably supporting the boss portion 61 of the driving gear 60 fixed at one end portion of the valve shaft 40 is fitted in the intake manifold 10, so that accuracy of mesh between the tooth portion 63 of the driving gear 60 and the worm gear 55 mounted on the rotary shaft of the motor 54 is affected by assembling position accuracy of the actuator 50 with respect to the intake manifold 10. In the aforementioned structure of the second embodiment, however, the bearing hole 52 for rotatably supporting the valve shaft 40 is formed in the housing 51 which constitutes part of the actuator 50, so that accuracy of mesh between the tooth portion 63 of the driving gear 60 and the worm gear 55 mounted on the rotary shaft of the motor 54 is not affected by assembling position accuracy of the actuator 50 with respect to the intake manifold 10. Consequently, the accuracy of mesh between the tooth portion 63 and the worm gear 55 increases in the structure of the second embodiment.

THIRD EMBODIMENT

Figure 6:
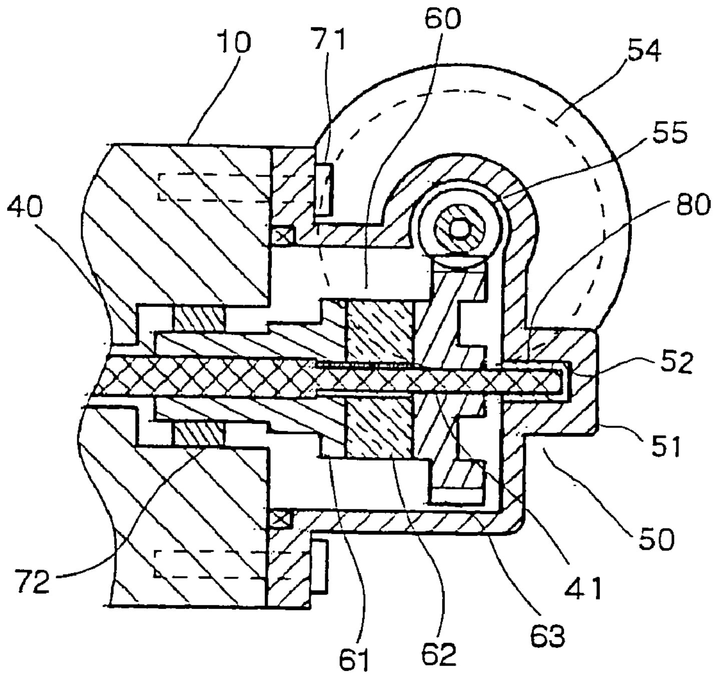
FIG. 6 is a cross-sectional view showing an actuator, a driving gear and components in surrounding areas thereof of an air intake control apparatus according to a third embodiment of the invention.

FIG. 6 is a cross-sectional view showing an actuator 50, a driving gear 60 and components in surrounding areas thereof of an air intake control apparatus 1 according to a third embodiment of the invention, in which elements identical or similar to those of the first embodiment (FIG. 1) are designated by the same reference numerals.

Referring to FIG. 6, the air intake control apparatus 1 of the third embodiment has essentially the same structure as that of the second embodiment except that a bushing 80 made of a low-friction sliding member is fitted in the bearing hole 52 formed in the housing 51 or on the projecting part 41 of the valve shaft 40 by press fit, for instance, so that the valve shaft 40 can smoothly rotate with low friction.

The aforementioned structure of the third embodiment serves to lessen frictional resistance exerted on the projecting part 41 of the valve shaft 40 from the bearing hole 52 and reduce the amount of torque needed for rotating the valve shaft 40.

FOURTH EMBODIMENT

Figure 7:
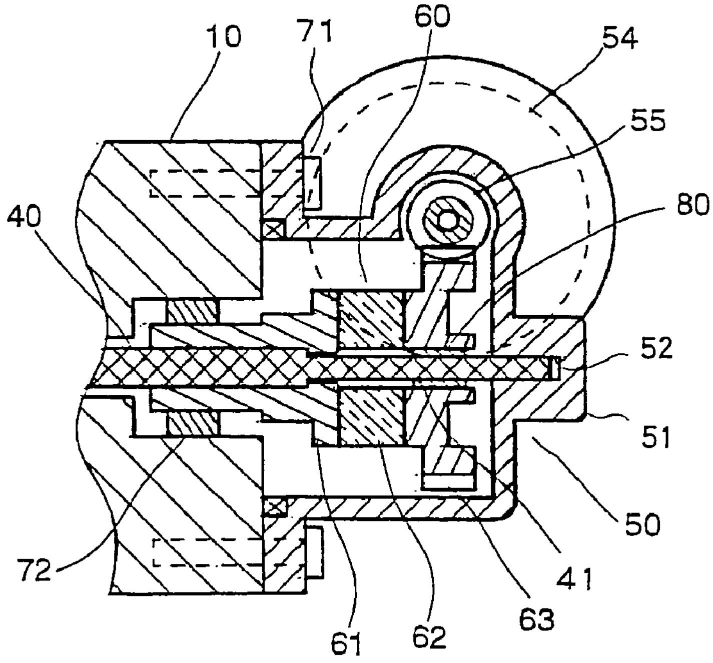
FIG. 7 is a cross-sectional view showing an actuator, a driving gear and components in surrounding areas thereof of an air intake control apparatus according to a fourth embodiment of the invention.

FIG. 7 is a cross-sectional view showing an actuator 50, a driving gear 60 and components in surrounding areas thereof of an air intake control apparatus 1 according to a fourth embodiment of the invention, in which elements identical or similar to those of the first embodiment (FIG. 1) are designated by the same reference numerals.

Referring to FIG. 7, a bushing 80 made of a low-friction sliding member is disposed between the projecting part 41 of the valve shaft 40 and the tooth portion 63 of the driving gear 60 in the fourth embodiment. The bushing 80 may be fitted in the central hole of the tooth portion 63 or on the projecting part 41 of the valve shaft 40.

When the valve elements 30 go into contact with the stoppers (not shown) at the fully opened position or at the completely closed position, the impact load acting on the valve elements 30 due to the inertia of the motor 54 and of the valve elements 30 is absorbed by the elastic member 62 as mentioned earlier. At this moment, there occurs a torque which causes relative rotation of the projecting part 41 of the valve shaft 40 and the tooth portion 63 of the driving gear 60. If the amount of frictional resistance occurring between the projecting part 41 of the valve shaft 40 and the central hole of the tooth portion 63 is large, the projecting part 41 of the valve shaft 40 will not smoothly rotate relative to the tooth portion 63 and the impact load acting on the valve elements 30 will be transmitted to the tooth portion 63, eventually diminishing the aforementioned effect of reducing the impact load on the tooth portion 63 of the driving gear 60.

In the aforementioned structure of the fourth embodiment, the low-friction bushing 80 is fitted between the projecting part 41 of the valve shaft 40 and the tooth portion 63 in the central hole formed therein, so that the amount of frictional resistance caused by relative rotary motion of the projecting part 41 of the valve shaft 40 and the tooth portion 63 of the driving gear 60 is reduced. As a result, the projecting part 41 of the valve shaft 40 can smoothly rotate relative to the tooth portion 63 and the impact load is less likely to be transmitted to the tooth portion 63 of the driving gear 60.

While the fourth embodiment has been described with reference to an example in which one end portion of the valve shaft 40 is supported by the bearing hole 52 formed in the housing 51 as illustrated in FIG. 7, the boss portion 61 of the driving gear 60 fixed at one end portion of the valve shaft 40 may be rotatably supported by a bearing as in the first embodiment.

FIFTH EMBODIMENT

Figure 8:
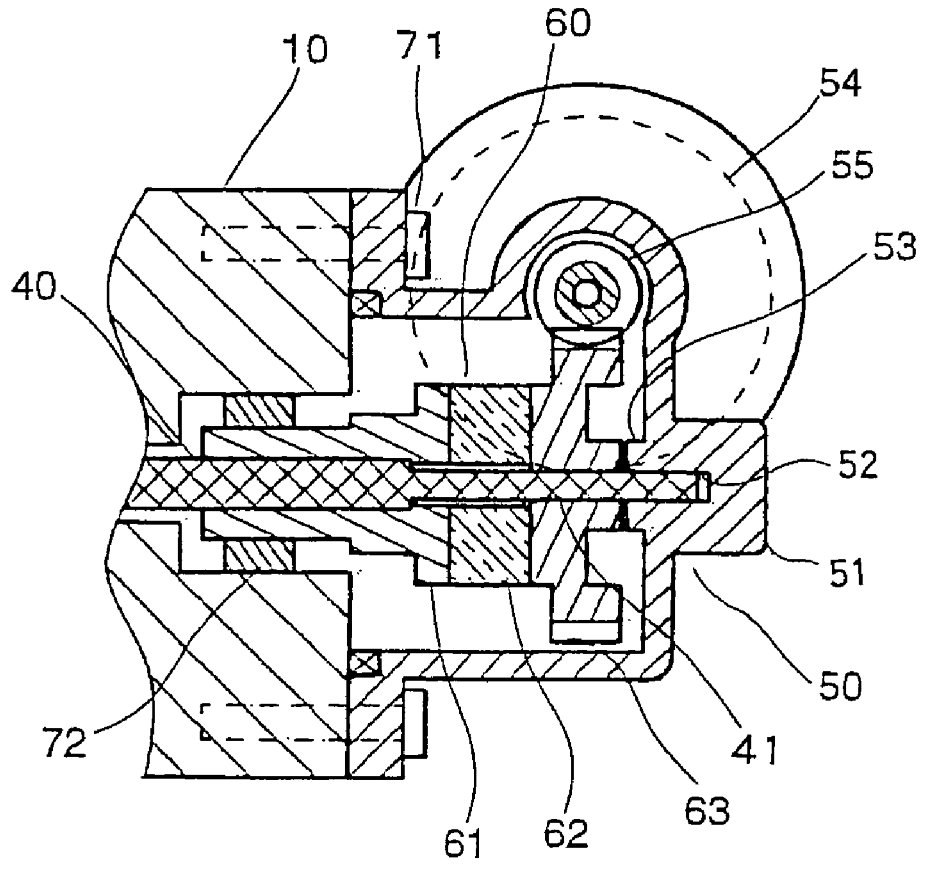
FIG. 8 is a cross-sectional view showing an actuator, a driving gear and components in surrounding areas thereof of an air intake control apparatus according to a fifth embodiment of the invention.

FIG. 8 is a cross-sectional view showing an actuator 50, a driving gear 60 and components in surrounding areas thereof of an air intake control apparatus 1 according to a fifth embodiment of the invention, in which elements identical or similar to those of the first embodiment (FIG. 1) are designated by the same reference numerals.

Referring to FIG. 8, the noncircular hole formed in the boss portion 61 of the driving gear 60 is made slightly larger than the noncircular portion of the valve shaft 40 in cross section so that the driving gear 60 can be smoothly moved along an axial direction of the valve shaft 40 in the fifth embodiment. Additionally, there is formed a protrusion 53 which goes into contact with a side surface of the tooth portion 63 of the driving gear 60 inside the housing 51 and there is provided a stopper (not shown) for limiting movement of the driving gear 60 along the axial direction of the valve shaft 40 in a direction opposite to the protrusion 53.

In the aforementioned structure of the fifth embodiment, the driving gear 60 can be smoothly moved along the axial direction of the valve shaft 40, so that the driving gear 60 can be fitted on the valve shaft 40 by hand without using a press fitting process or the like. Therefore, the fifth embodiment provides ease of assembly.

The protrusion 53 which goes into contact with the side surface of the tooth portion 63 and the aforementioned stopper for limiting movement of the driving gear 60 along the axial direction of the valve shaft 40 in the direction opposite to the protrusion 53 together constitute a movement restrictor for limiting the distance of movement of the driving gear 60 along the axial direction of the valve shaft 40. This structure of the fifth embodiment serves to ensure that the worm gear 55 and the tooth portion 63 of the driving gear 60 mesh over proper dimensions.

While the fifth embodiment has been described with reference to an example in which one end portion of the valve shaft 40 is supported by the bearing hole 52 formed in the housing 51 as illustrated in FIG. 8, the boss portion 61 of the driving gear 60 fixed at one end portion of the valve shaft 40 may be rotatably supported by a bearing as in the first embodiment.

While the invention has thus far been described as being implemented in the air intake control apparatus 1 which is an example of an air intake control system provided in an air intake line of an internal combustion engine in the foregoing first to fifth embodiments, the above-described structures of the first to fifth embodiments can also be applied to an intake vortex generator provided in the air intake line of the internal combustion engine.

The aforementioned intake vortex generator is a system provided in the air intake line of the internal combustion engine for producing swirl in a combustion chamber of each cylinder by reducing the cross-sectional area of an intake passageway by means of a swirl valve (valve element) in low engine speed ranges. The intake vortex generator increases burn rate (i.e., mixture burning velocity) to improve combustion efficiency and fuel economy and thereby reduces noxious emissions.

It is appreciated from the foregoing that the air intake control system of the invention can be effectively applied either as an air intake control apparatus or as an intake vortex generator provided in the air intake line of the internal combustion engine of a motor vehicle, for example.

What is claimed is:

1. An air intake control system comprising:

- an intake passage for supplying intake air to an internal combustion engine;
- a valve element disposed in the intake passage for varying the cross-sectional area of the intake passage by pivoting between fully opened and completely closed positions;
- a valve shaft for transmitting a driving force for pivoting the valve element to the valve element;
- an actuator including:
  - a prime mover for supplying said driving force for pivoting the valve element;
  - a driving force transmission gear which is fitted to the prime mover and rotated thereby; and
  - a housing accommodating the prime mover and the driving force transmission gear; and
- a driving gear which is mounted on the valve shaft and meshes with the driving force transmission gear to transmit said driving force supplied from the actuator to the valve shaft, the driving gear including:
  - a boss portion;
  - a tooth portion which meshes with the driving force transmission gear to receive said driving force supplied from the actuator; and an elastic member which is sandwiched between and bonded to the boss portion and the tooth portion and elastically deforms when twisted;

wherein the boss portion has a hole into which the valve shaft is inserted in such a manner that the boss portion rotates together with the valve shaft, the tooth portion and the elastic member have holes into which the valve shaft is inserted in such a manner that the tooth portion and the elastic member can rotate relative to the valve shaft, and wherein an impact load caused by opening and closing motion of the valve element is alleviated by torsional deformation of the elastic member in a turning direction of the valve shaft.

2. The air intake control system according to claim 1, wherein the boss portion and the tooth portion of the driving gear are formed by molding polyamide resin and the elastic member is formed by molding vulcanized synthetic nitrile rubber between the boss portion and the tooth portion, whereby the elastic member is bonded to the boss portion and the tooth portion, together forming a single structure.

3. The air intake control system according to claim 1, wherein a portion of the valve shaft where the tooth portion and the elastic member of the driving gear are fitted has a cylindrical cross section, a portion of the valve shaft where the boss portion of the driving gear is fitted has a noncircular cross section as viewed along a central axis of the valve shaft, and said hole formed in the boss portion has the same noncircular cross-sectional shape as said portion of the valve shaft where the boss portion is fitted.

4. The air intake control system according to claim 3, wherein said hole formed in the boss portion is made slightly larger than said portion of the valve shaft where the boss portion is fitted as viewed in cross section so that the driving gear can be moved relative to the valve shaft along an axial direction thereof, said air intake control system further comprising a movement restrictor for limiting the distance of movement of the driving gear along the axial direction.

5. The air intake control system according to claim 3, wherein said portion of the valve shaft having the cylindrical cross section is an end portion of the valve shaft and there is formed a bearing hole in the housing of the actuator for rotatably supporting said cylindrical end portion of the valve shaft.

6. The air intake control system according to claim 5 further comprising a sliding member fitted between said bearing hole formed in the housing of the actuator and said cylindrical end portion of the valve shaft.

7. The air intake control system according to claim 1 further comprising a sliding member fitted between said hole formed in the tooth portion of the driving gear and the valve shaft.

* * * * *